US010699013B2

(12) United States Patent
Warpinski et al.

(10) Patent No.: US 10,699,013 B2
(45) Date of Patent: Jun. 30, 2020

(54) SYSTEMS AND METHODS FOR USB/FIREWIRE PORT MONITORING, FILTERING, AND SECURITY

(71) Applicant: Honeywell International Inc., Morris Plains, NJ (US)

(72) Inventors: Matthew Warpinski, Albuquerque, NM (US); James Christopher Kirk, Clarksville, MD (US); Brian Adams, Albuquerque, NM (US)

(73) Assignee: Honeywell International Inc., Morris Plains, NJ (US)

( * ) Notice: Subject to any disclaimer, the term of this patent is extended or adjusted under 35 U.S.C. 154(b) by 190 days.

(21) Appl. No.: 15/463,165

(22) Filed: Mar. 20, 2017

(65) Prior Publication Data
US 2018/0268144 A1 Sep. 20, 2018

(51) Int. Cl.
G06F 21/00 (2013.01)
G06F 21/57 (2013.01)
G06F 21/85 (2013.01)
G06F 21/62 (2013.01)
G06F 13/42 (2006.01)

(52) U.S. Cl.
CPC .......... G06F 21/57 (2013.01); G06F 21/6236 (2013.01); G06F 21/85 (2013.01); G06F 13/426 (2013.01); G06F 2213/0042 (2013.01); G06F 2221/034 (2013.01)

(58) Field of Classification Search
CPC ....................................... G06F 21/57
USPC ........................................... 726/22
See application file for complete search history.

(56) References Cited

U.S. PATENT DOCUMENTS 7,877,788 B1 1/2011 Topp et al.
8,086,781 B2 12/2011 Ananny et al.
8,209,739 B2 6/2012 Terpening et al.
(Continued)

FOREIGN PATENT DOCUMENTS

EP 2 958 047 A1 6/2015
WO 2012/106049 A1 8/2012

OTHER PUBLICATIONS

Extended European Search Report dated Jul. 11, 2018 in European Application No. 18162131.9.
(Continued)

Primary Examiner — Harris C Wang

(57) ABSTRACT

A device for securing USB or Firewire port interconnections includes a microcontroller comprising a processor; a first connector/lead in communication with the microcontroller and configured to be coupled with a USB or Firewire external device; and a second connector/lead in communication with the microcontroller and configured to be coupled with a protected host. An optional user interface communicates with the microcontroller. When the microcontroller detects that the external device is coupled to the first connector/lead, the processor is configured to display a prompt on the user interface for a user to initiate inputs prior to the external device being allowed to connect with the protected host; or is configured to automatically prevent the external device from being connected with the protected host if the external device is on a blacklist of devices known to have device handlers in the protected host at a BIOS level, without modifying the protected host.

17 Claims, 8 Drawing Sheets

(56) References Cited

U.S. PATENT DOCUMENTS

| | | | |
|---|---|---|---|
| 8,230,149 B1* | 7/2012 | Long | G06F 21/85 710/305 |
| 8,646,082 B2 | 2/2014 | Lomont et al. | |
| 8,862,803 B2 | 10/2014 | Powers et al. | |
| 9,021,597 B2 | 4/2015 | Moore et al. | |
| 9,026,712 B2 | 5/2015 | Kwidzinski et al. | |
| 9,213,829 B2 | 12/2015 | Jeansonne et al. | |
| 9,223,958 B2* | 12/2015 | Rubinstein | G06F 21/445 |
| 9,460,319 B1 | 10/2016 | Munns et al. | |
| 9,965,655 B1* | 5/2018 | Null | H04L 63/08 |
| 2003/0217254 A1* | 11/2003 | Page | G06F 8/60 713/2 |
| 2006/0107037 A1* | 5/2006 | Lincoln | G06F 21/12 713/155 |
| 2009/0089460 A1* | 4/2009 | Komoda | G06F 12/1458 710/13 |
| 2010/0056270 A1* | 3/2010 | Lee | G06F 13/4081 463/29 |
| 2011/0030030 A1* | 2/2011 | Terpening | G06F 21/6236 726/1 |
| 2011/0208963 A1 | 8/2011 | Soffer | |
| 2012/0042099 A1* | 2/2012 | Wong | G06F 21/44 710/9 |
| 2012/0311207 A1* | 12/2012 | Powers | G06F 13/42 710/106 |
| 2012/0331304 A1* | 12/2012 | She | G06F 21/602 713/189 |
| 2013/0014221 A1* | 1/2013 | Moore | G06F 21/85 726/3 |
| 2013/0055044 A1 | 2/2013 | Eljezovic et al. | |
| 2015/0058912 A1* | 2/2015 | Raskin | G06F 21/85 726/1 |
| 2015/0058991 A1 | 2/2015 | Gourley | |
| 2015/0365237 A1* | 12/2015 | Soffer | G06F 21/85 726/20 |
| 2016/0048825 A1* | 2/2016 | Swamy | G06Q 20/3674 705/67 |
| 2016/0085976 A1* | 3/2016 | Schiffman | G06F 21/62 726/30 |
| 2016/0299865 A1* | 10/2016 | Hetzler | G06F 13/4068 |
| 2016/0373408 A1* | 12/2016 | Wentworth | H04L 63/0227 |
| 2017/0187539 A1* | 6/2017 | Thompson | H04B 7/18506 |
| 2018/0091519 A1* | 3/2018 | Steele | H04W 12/08 |

OTHER PUBLICATIONS

Lomont, "USB Firewall for Direct Connect USB Cyber Warfare Protection", SBIR.gov, Aug. 30, 2015, pp. 1-4, Publisher: Cybernet Systems Corporation.

"USB Firewall for Direct Connect USB Cyber Warfare Protection", pp. 1-2, Publisher: SBIRSource.

"USB Firewall", http://www.cybernet.com/programs/511/index.html, Aug. 30, 2015, p. 1 Publisher: Cybernet Systems Corporation.

* cited by examiner

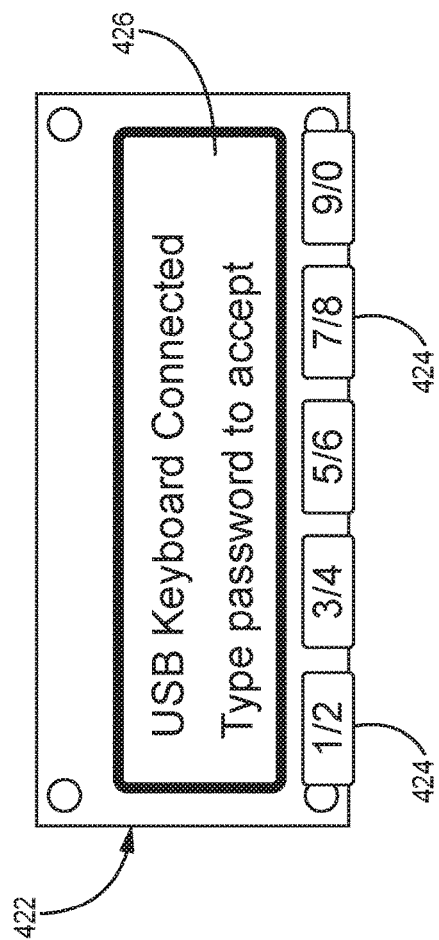
FIG. 5A
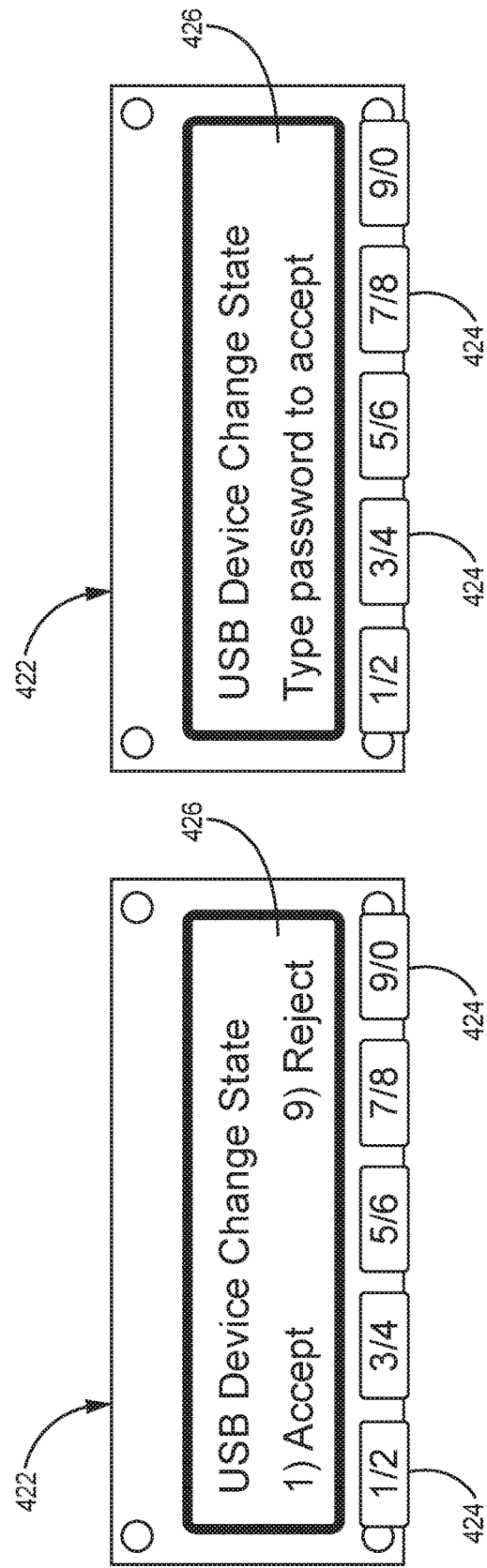
FIG. 5B
FIG. 5C

SYSTEMS AND METHODS FOR USB/FIREWIRE PORT MONITORING, FILTERING, AND SECURITY

BACKGROUND

A universal serial bus (USB) port is architecturally configured to communicate directly to the underlying firmware that operates a computer. When a USB device is connected to a computer, protocols are run at a level below any computer firewalls or other anti-malware software shields that can be placed on the computer. As a result, USB devices have become a common mechanism for propagation of malicious software, making it possible to infect a computer that is not even connected to the Internet. For example, USB thumb drives are inherently insecure, and as such, malicious code and/or attacks can be inserted into a computer before any kind of anti-virus protection can detect such attacks. There are currently no available ways to detect a malicious USB device before it has done damage, and often, it is impossible to tell that the damage has been done.

The USB port has become a ubiquitous mechanism for interfacing a device to a computer. As such, simply removing the USB port can cripple the usefulness of a computer. While USB drivers on a computer can be removed, this would also cripple the computer in many ways, as modern operating systems rely on USB drivers to provide boot and operating system load paths. Removing USB drivers would also present the danger that a USB port that has been so diminished will be restored during an update or repair.

Accordingly, a technique of defending against malicious devices as a part of the basic computer/server hardware architecture is needed.

SUMMARY

A device for securing USB or Firewire port interconnections is disclosed. The device comprises a microcontroller comprising at least one processor; a first connector or lead in operative communication with the microcontroller, the first connector or lead configured to be coupled with a USB or Firewire external device; and a second connector or lead in operative communication with the microcontroller, the second connector or lead configured to be coupled with a protected host. An optional user interface can be in operative communication with the microcontroller and configured to receive one or more user inputs. When the microcontroller detects that the USB or Firewire external device is coupled to the first connector or lead, the at least one processor is configured to display a prompt on the user interface, when present, for a user to initiate one or more inputs prior to the USB or Firewire external device being allowed to connect with the protected host. Alternatively, the at least one processor is configured to automatically prevent the USB or Firewire external device from being connected with the protected host if the USB or Firewire external device is on a blacklist of devices known to have device handlers in the protected host at a BIOS level, without modifying the protected host.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIGS. 5A-5C show examples of different information that can be displayed on a user interface of the USB/Firewire port security device of FIG. 4;

DETAILED DESCRIPTION

Figure 1:
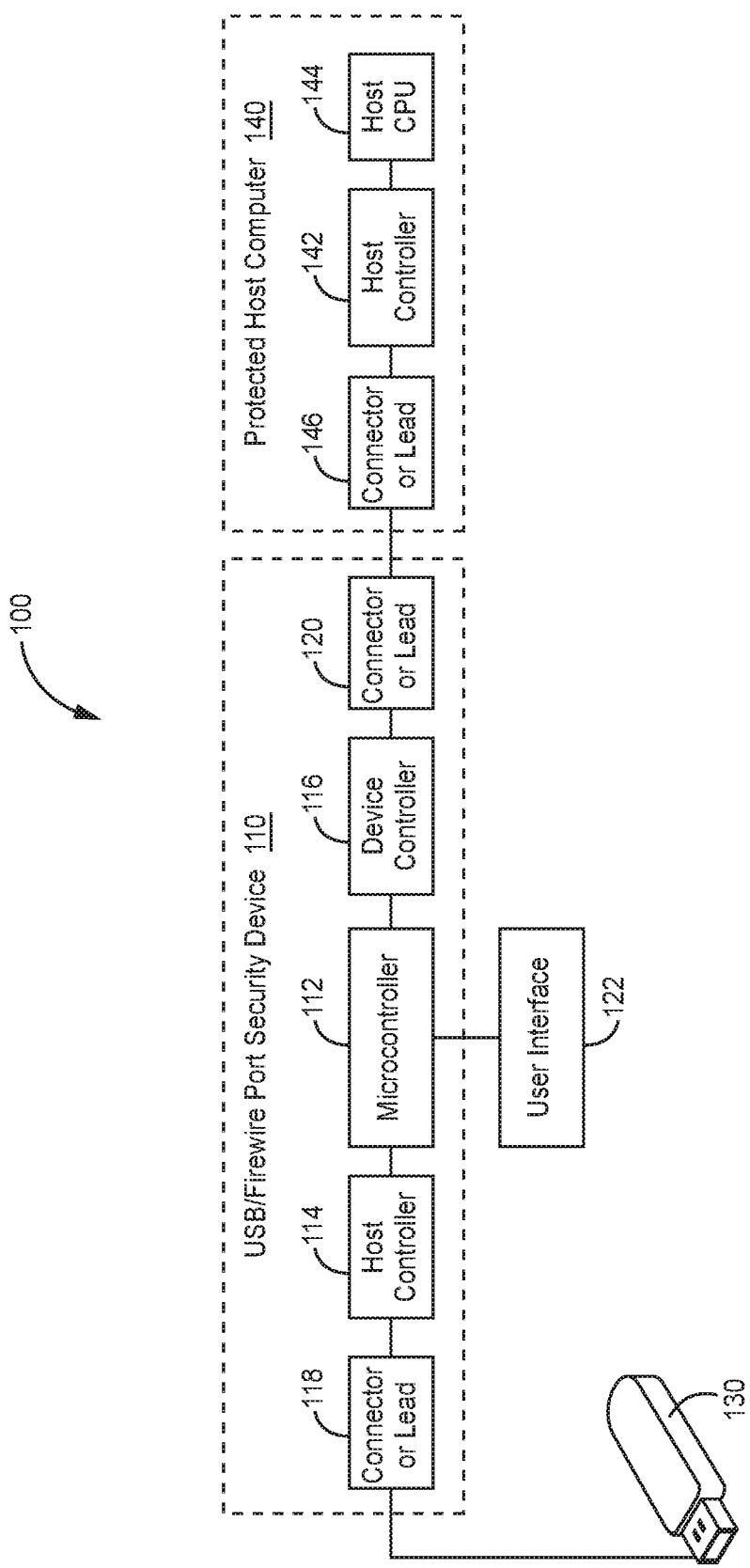
FIG. 1 is a block diagram of an interconnection security system, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Systems and methods are disclosed herein for providing monitoring, filtering, and security for connections of universal serial bus (USB) or IEEE 1394 (Firewire) devices to a protected host. The systems and methods allow users to employ a limited type set of USB or Firewire devices, without enabling the ability to corrupt a protected host computer or other device at a basic firmware level. The present approach provides for an interim scrutiny of a USB or Firewire device prior to allowing any file/data traffic to the protected host.

A system according to the present approach generally includes a USB/Firewire port security device that provides a secure connection between an external USB or Firewire device and a protected host computer or other device. In one embodiment, a user can administratively configure the interconnection security device based on any of the criteria listed in a device descriptor field based on a USB/Firewire standard. In some implementations, a user authentication such as by a password can be required by the port security device to allow for any external USB/Firewire connection. For example, when a user connects an external USB or Firewire device, the user is prompted to enter a password prior to the USB or Firewire device being allowed to communicate with the protected host computer or other device.

In some embodiments, the port security device includes a user interface with input buttons associated with a display. The input buttons provide for setting up the device configuration, as well as the numbers and/or letters for a user password. For example, the user interface can be implemented with a liquid crystal display (LCD) and associated input buttons.

In some embodiments, a user interface can be provided by a graphical user interface (GUI) such as on a host computer. The GUI can be implemented with the same features and prompts indicating that a new device is detected, and can require authentication. Additionally, in some embodiments, the port security device can be wirelessly connected to a portable device, such as a tablet or smart phone.

An administrator screen can be implemented with enable/disable functions for each USB/Firewire device type, and password protection from changing USB/Firewire device types that are allowed. For example, the disable function can be used to turn off USB storage devices, a keyboard, or hub. The enable function can be used to allow keyboards on a specific USB port, for example.

In some implementations, the port security device can be used to create a whitelist of USB/Firewire device classes that are allowed to connect to a protected host computer. The port security device can also be used to create a blacklist of USB/Firewire device classes that are not allowed to connect to a protected host.

Further details of the present systems and methods are described hereafter with reference to the drawings.

FIG. 1 illustrates an interconnection security system 100, according to one embodiment, which generally includes a USB/Firewire port security device 110 that provides a secure interconnection between an external USB/Firewire device 130 and a protected host computer 140. The port security device 110 generally includes a microcontroller 112, a host controller 114 that operatively communicates with microcontroller 112, and a device controller 116 that also operatively communicates with microcontroller 112.

A first connector or lead 118 operatively communicates with host controller 114, and a second connector or lead 120 operatively communicates with device controller 116. The first connector or lead 118 is configured for connection with external USB/Firewire device 130. The second connector or lead 120 is configured for connection with protected host computer 140.

The microcontroller 112 generally includes a processor and a memory unit, which stores instructions executable by the processor. For example, the instructions can be implemented to automatically blacklist any device known to have device handlers in protected host computer 140 at a basic input output system (BIOS) level, without modifying protected host computer 140.

The port security device 110 can also be optionally implemented with a user interface 122, which operatively communicates with microcontroller 112. The user interface 122 is configured to receive one or more user inputs, and can display information to the user. The protected host computer 140 includes a host controller 142 that operatively communicates with a host computer processing unit (CPU) 144. A host connector or lead 146 operatively communicates with host controller 142. The protected host computer 140 is connected to port security device 110 by coupling connector or lead 146 with connector or lead 120, such as with a cable (between connectors) or with a board trace (between leads in embedded implementations), or the like.

During operation of port security device 110, microcontroller 112 detects that external USB/Firewire device 130 has been connected to connector or lead 118 through host controller 114. If blacklisted, USB/Firewire device 130 is automatically prevented from being connected with host computer 140. Alternatively, when user interface 122 is employed, a prompt is displayed that requires the user to initiate one or more user inputs prior to external USB/Firewire device 130 being allowed to connect with host computer 140.

Figure 2:
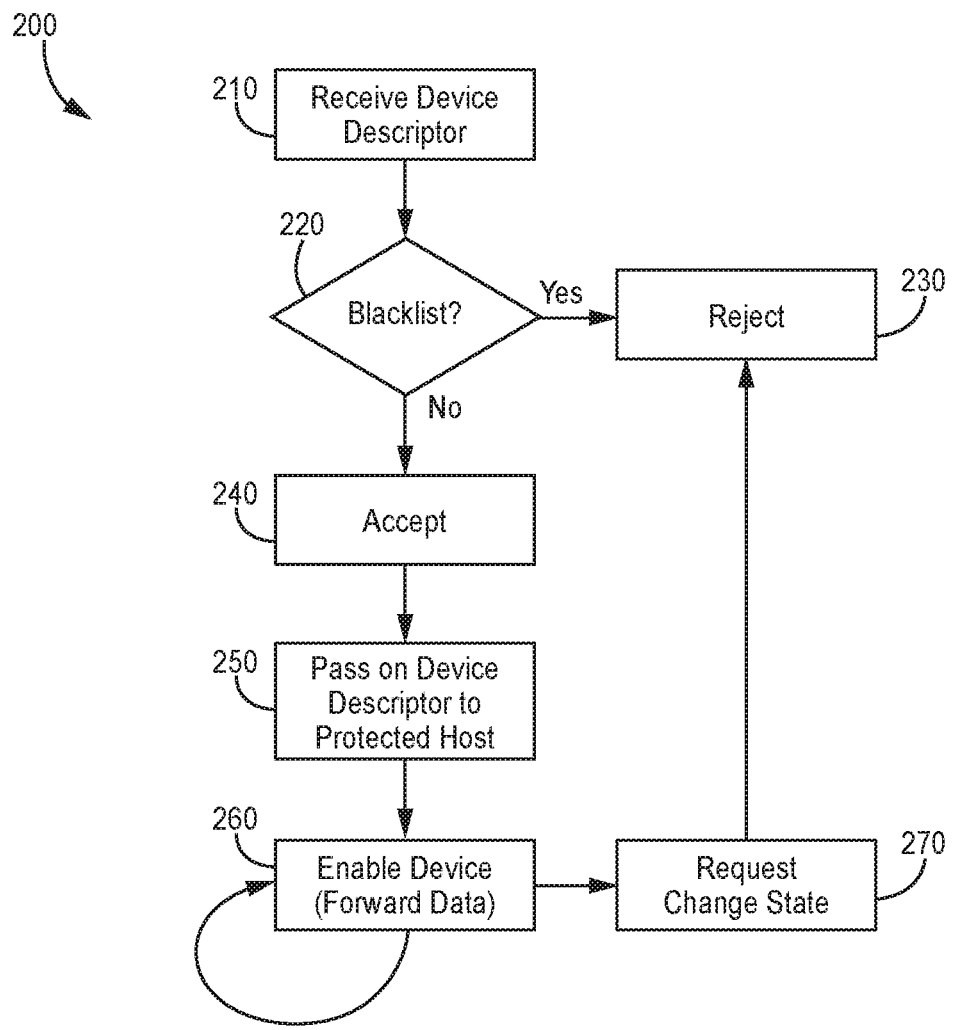
FIG. 2 is a flow diagram of a method for operating an interconnection security system, according to one implementation.

FIG. 2 is a flow diagram of a method 200 for securing USB or Firewire port interconnections, such as with interconnection security system 100 (FIG. 1), according to one implementation, which is based on administrative policy and a blacklist of USB or Firewire devices. When a USB or Firewire external device is connected to the port security device, a device descriptor is received by the microcontroller (block 210), and a determination is made whether the device descriptor is on a blacklist (block 220). If yes, the external device is rejected (block 230) and not allowed to connect with a protected host computer or other device. If the device descriptor is not on the blacklist, the device descriptor is accepted (block 240). The device descriptor is then passed on to the protected host (block 250). An enable device command then allows forwarding of data from the external device to the protected host (block 260). If a request to change state is received thereafter by the host controller from the external device (block 270), the external device is then rejected (block 230).

Figure 3:
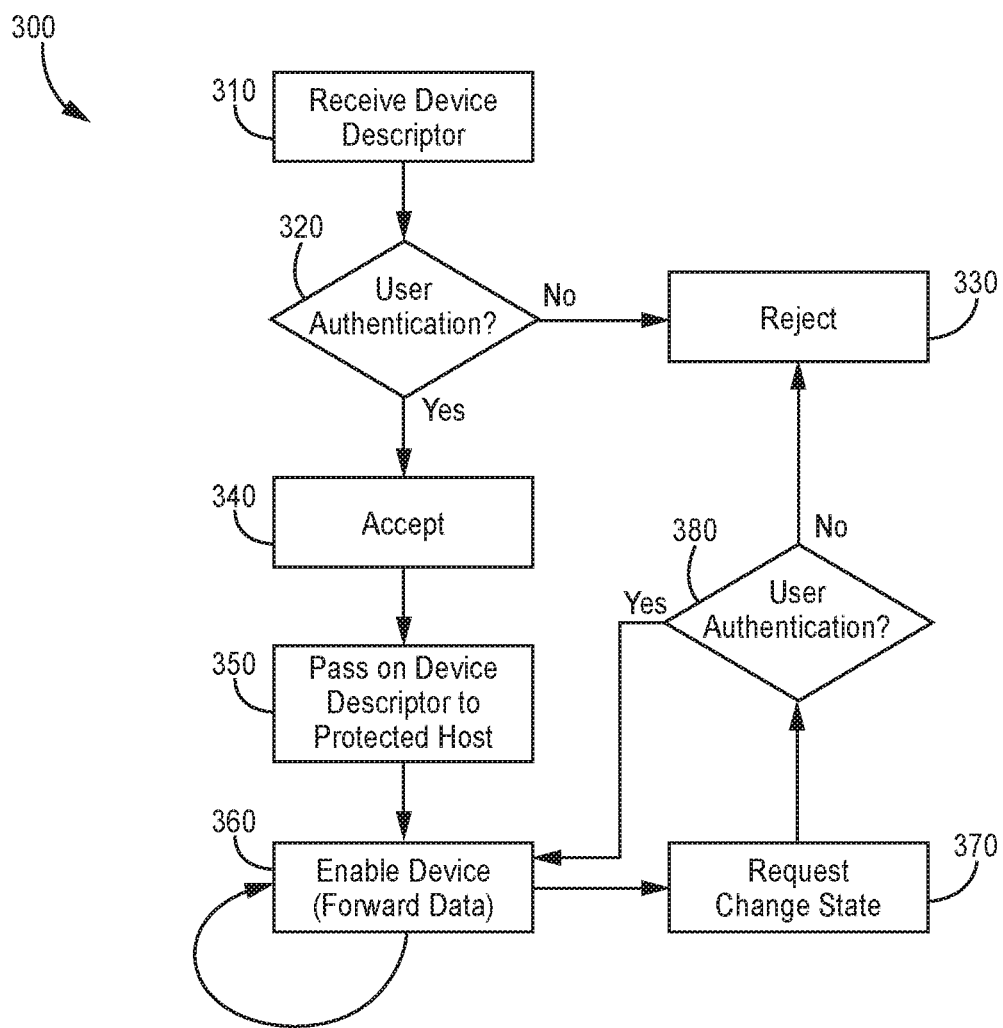
FIG. 3 is a flow diagram of a method for operating an interconnection security system, according to another implementation.

FIG. 3 is a flow diagram of a method 300 for securing USB or Firewire port interconnections, such as with interconnection security system 100, according to another implementation, which includes use of a display screen that requires user authentication or a user password. When a USB or Firewire external device is connected to the port security device, a device descriptor is received by the microcontroller (block 310). A determination is then made whether a valid user authentication has been entered (block 320). If not, the external device is rejected (block 330) and not allowed to connect with a protected host computer or other device. If a valid user authentication has been entered, the device descriptor is accepted (block 340). The device descriptor is then passed on to the protected host (block 350). An enable device command then allows forwarding of data from the external device to the protected host (block 360). If a request to change state is received thereafter by the host controller from the external device (block 370), a determination is again made whether a valid user authentication has been entered (block 380). If yes, the enable device command continues to forward data from the external device to the protected host (block 360). If a valid user authentication has not been entered for the request to change state, the external device is then rejected (block 330).

Various exemplary embodiments of the USB/Firewire port security device are described as follows.

Figure 4:
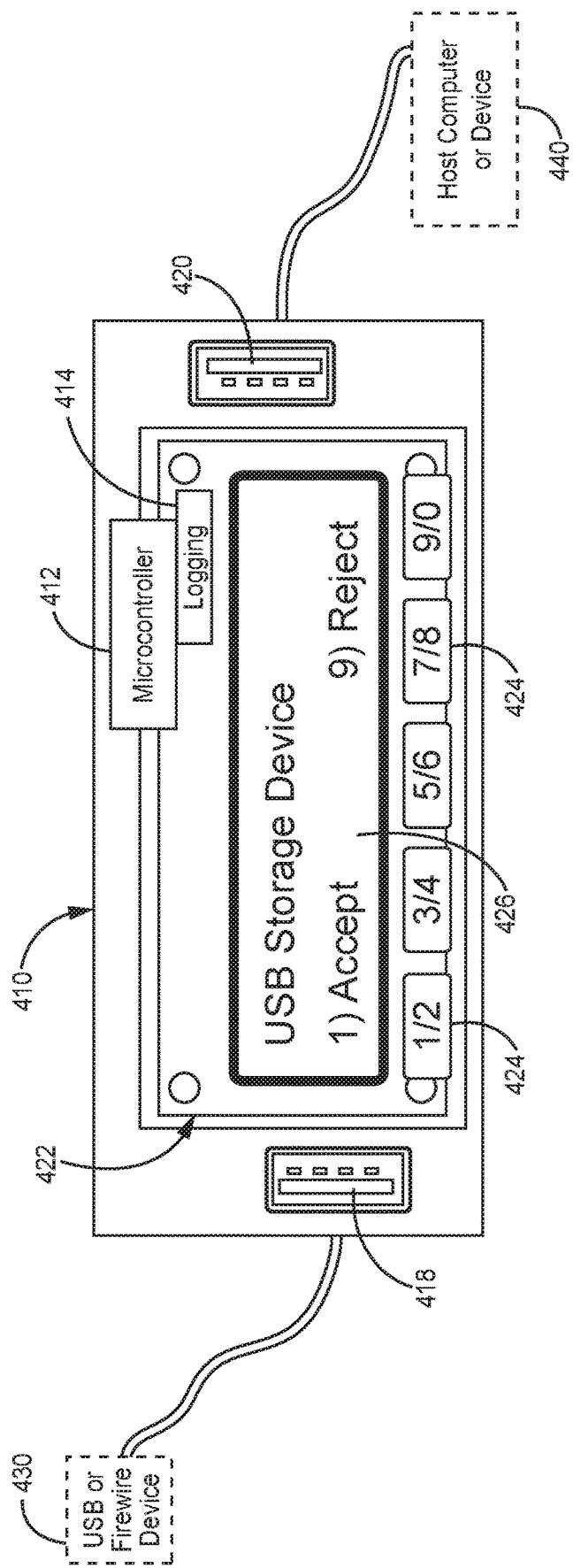
FIG. 4 is a block diagram of a USB/Firewire port security device, according to one embodiment.

FIG. 4 illustrates a USB/Firewire port security device 410 according to one embodiment. The port security device 410 generally includes at least one processor implemented in a microcontroller 412. A logging function 414 operatively communicates with microcontroller 412, and is configured to log connection attempts and to make such logs available for security analysis. A device side connector 418 operatively communicates with microcontroller 412, and is configured to provide a connection to a USB or Firewire external device 430. A host side connector 420 operatively communicates with microcontroller 412, and is configured to provide a connection to a protected host computer or device 440.

The port security device 410 also has a user interface 422, which operatively communicates with microcontroller 412. The user interface 422 is configured to receive one or more user inputs through a series of input buttons 424, and shows information to the user on a screen 426, such as an LCD display. For example, when a USB device such as a thumb drive is connected to connector 418, microcontroller 412 causes the message "USB Storage Device" to be displayed on screen 426 along with prompts to "Accept" or "Reject" using identified input buttons.

FIGS. 5A-5C depict examples of different information that can be shown on user interface 422. For example, as shown in FIG. 5A, when a USB enabled keyboard is connected, the message "USB Keyboard Connected" is displayed on screen 426 along with the prompt "Type password to accept" using input buttons 424. In the example of FIG. 5B, when a request to change state is detected (e.g., change state from a storage connection to a keyboard connection), the message "USB Device Change State" is displayed on screen 426, along with prompts to "Accept" or "Reject" using identified input buttons 424. In the example of FIG. 5C, when a request to change state is detected, the message "USB Device Change State" is displayed on screen 426, along with the prompt "Type password to accept" using input buttons 424.

Figure 6:
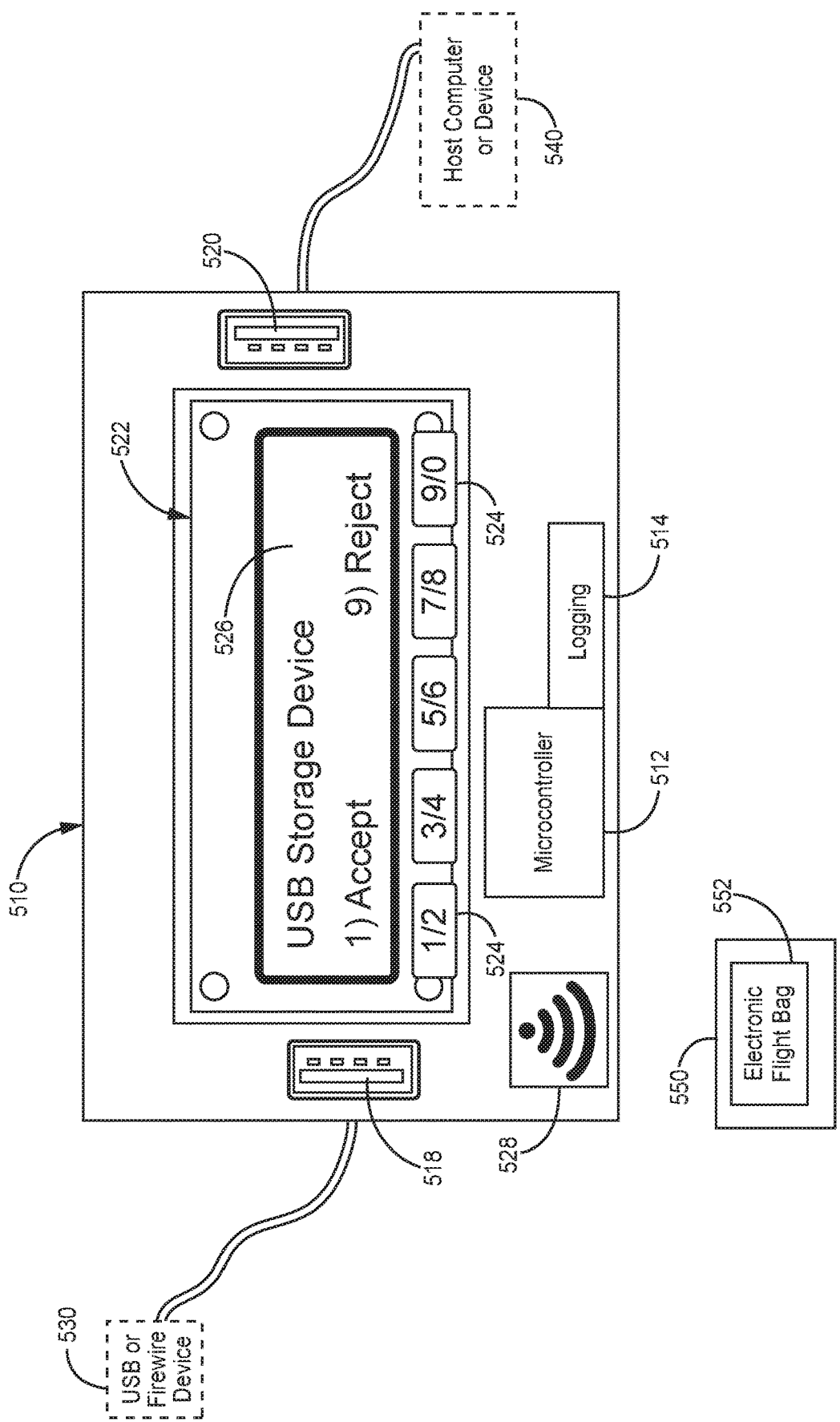
FIG. 6 is a block diagram of a USB/Firewire port security device, according to another embodiment.

FIG. 6 illustrates a USB/Firewire port security device 510 according to another embodiment. The port security device 510 includes at least one processor implemented in a microcontroller 512, and a logging function 514 that operatively communicates with microcontroller 512. A device side connector 518 operatively communicates with microcontroller 512, and is configured to provide a connection to a USB or Firewire device 530. A host side connector 520 operatively communicates with microcontroller 512, and is configured to provide a connection to a protected host computer or device 540.

The port security device 510 has a user interface 522, which operatively communicates with microcontroller 512. The user interface 522 is configured to receive one or more user inputs through a series of input buttons 524, and displays information to the user on a screen 526. For example, when a USB device is connected to connector 518, microcontroller 512 causes the message "USB Storage Device" to be displayed on screen 526 along with prompts to "Accept" or "Reject" using identified input buttons. Additionally, other information can be displayed on screen 526, such as described previously.

The port security device 510 also includes a wireless transceiver 528 in operative communication with microcontroller 512 and configured for wireless connection (e.g., WiFi, Bluetooth) with a portable device 550 such as a tablet (e.g., iPad). In one implementation, portable device 550 can include an electronic flight bag (EFB) application 552, which can be employed to wirelessly transmit various flight data to the host computer, such as a flight computer, through port security device 510.

Figure 7:
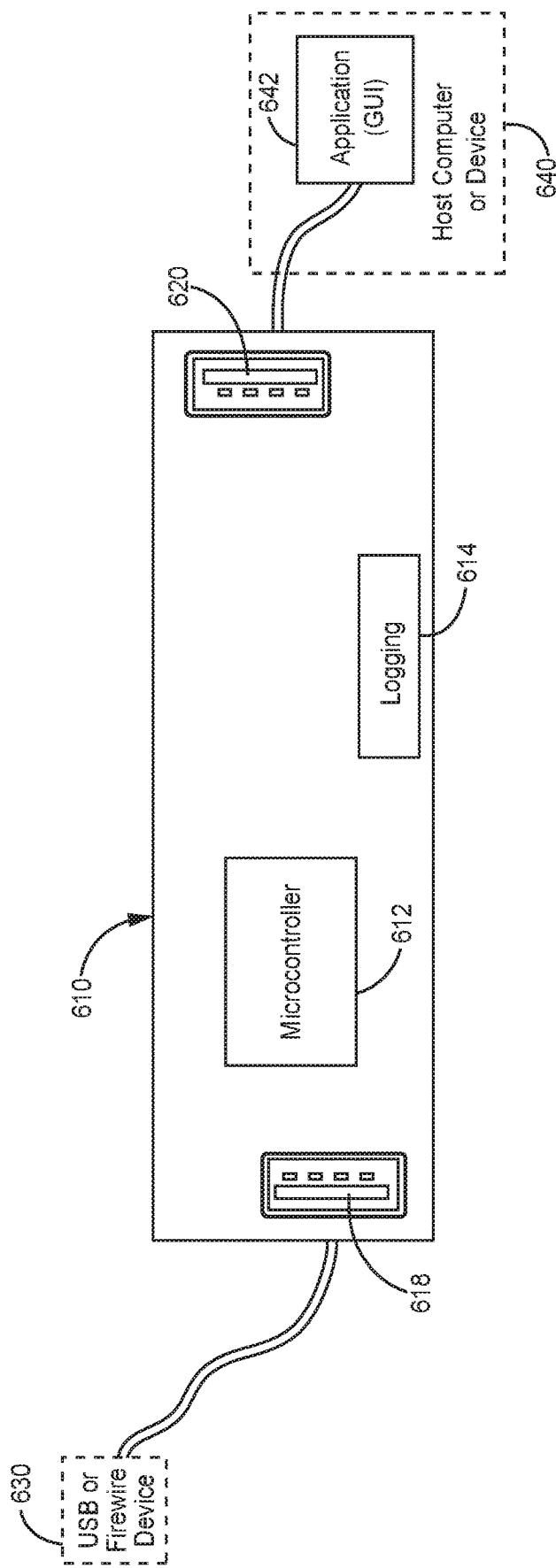
FIG. 7 is a block diagram of a USB/Firewire port security device, according to a further embodiment.

FIG. 7 depicts a USB/Firewire port security device 610 according to a further embodiment. The port security device 610 generally includes at least one processor implemented in a microcontroller 612, and a logging function 614 that operatively communicates with microcontroller 612. A device side connector 618 operatively communicates with microcontroller 612, and is configured to provide a connection to a USB or Firewire device 630. A host side connector 620 operatively communicates with microcontroller 612, and is configured to provide a connection to a protected host computer or device 640.

The port security device 610 differs from previous embodiments in that it does not include a user interface directly coupled therewith. Rather, an application 642 such as a GUI, which can be associated with host computer or device 640, allows for an administrative policy and blacklist to be managed by a user. Alternatively, the GUI can be implemented with the same features and prompts for the user interfaces discussed previously, indicating that an external device is detected and requires authentication.

Figure 8:
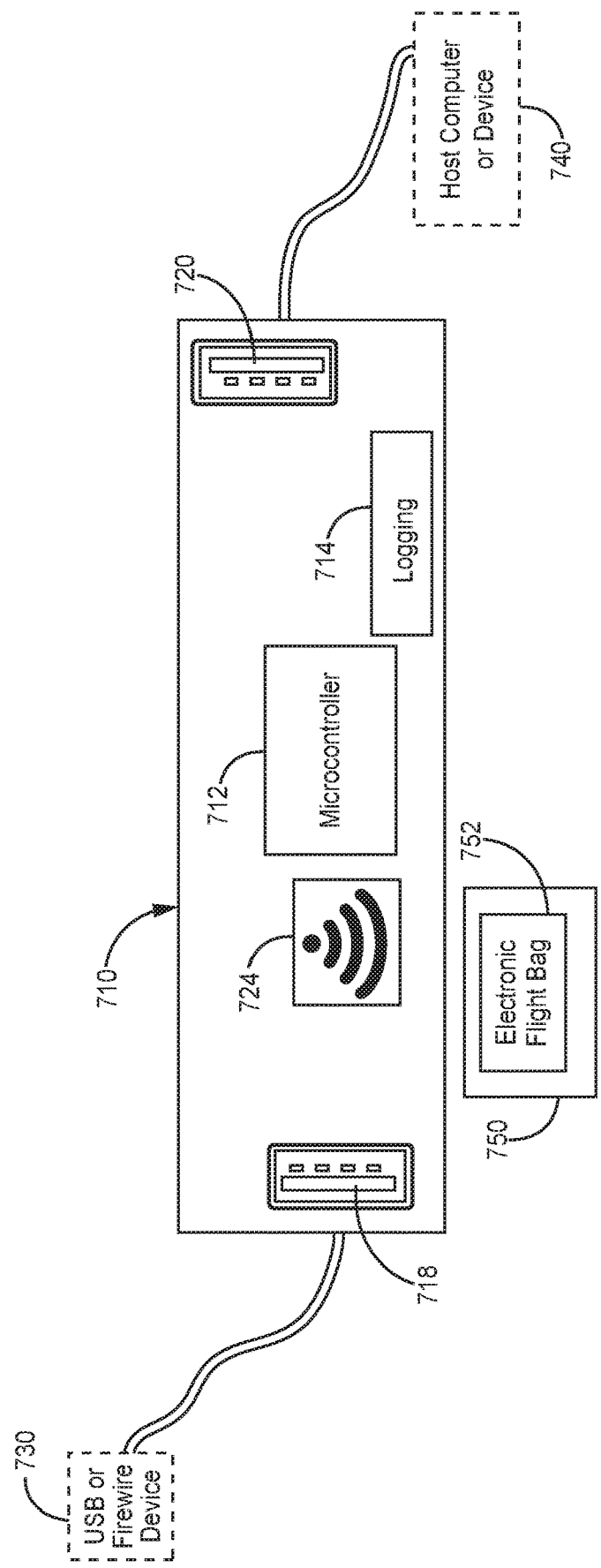
FIG. 8 is a block diagram of a USB/Firewire port security device, according to an alternative embodiment.

FIG. 8 depicts a USB/Firewire port security device 710 according to a further embodiment. The port security device 710 generally includes at least one processor implemented in a microcontroller 712, and a logging function 714 that operatively communicates with microcontroller 712. A device side connector 718 operatively communicates with microcontroller 712, and is configured to provide a connection to a USB or Firewire device 730. A host side connector 720 operatively communicates with microcontroller 712, and is configured to provide a connection to a protected host computer or device 740.

The port security device 710 also includes a wireless transceiver 724 in operative communication with microcontroller 712 and configured for wireless connection with a portable device 750 such as a tablet. In one implementation, portable device 750 can include an EFB application 752, which can be employed to wirelessly transmit various flight data to the host computer, such as a flight computer, through port security device 710.

The port security device 710 does not include a user interface directly coupled therewith. Instead, port security device 710 operates based on administrative policy and a blacklist of USB or Firewire devices. In one implementation, portable device 750 can be implemented with an application that allows for the administrative policy and blacklist to be managed by a user.

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a device for securing universal serial bus (USB) or Firewire port interconnections, the device comprising: a microcontroller comprising at least one processor; a first connector or lead in operative communication with the microcontroller, the first connector or lead configured to be coupled with a USB or Firewire external device; a second connector or lead in operative communication with the microcontroller, the second connector or lead configured to be coupled with a protected host; and an optional user interface in operative communication with the microcontroller and configured to receive one or more user inputs. When the microcontroller detects that the USB or Firewire external device is coupled to the first connector or lead, the at least one processor is configured to: display a prompt on the user interface, when present, for a user to initiate one or more inputs prior to the USB or Firewire external device being allowed to connect with the protected host; or automatically prevent the USB or Firewire external device from being connected with the protected host if the USB or Firewire external device is on a blacklist of devices known to have device handlers in the protected host at a basic input output system (BIOS) level, without modifying the protected host.

Example 2 includes the device of Example 1, further comprising a logging function in operative communication with the microcontroller.

Example 3 includes the device of any of Examples 1-2, wherein the user interface is implemented with a series of input buttons associated with a display screen.

Example 4 includes the device of any of Examples 1-3, wherein the user interface is implemented by a graphical user interface on the protected host, wherein the protected host comprises a computer.

Example 5 includes the device of any of Examples 1-4, further comprising a wireless transceiver in operative communication with the microcontroller and configured for wireless connection with a portable device.

Example 6 includes the device of Example 5, wherein the portable device comprises a tablet or a smart phone.

Example 7 includes the device of any of Examples 5-6, wherein the portable device includes an electronic flight bag application.

Example 8 includes a method for securing USB or Firewire port interconnections, the method comprising providing a port security device that is operatively coupled to a protected host computer or device, the port security device including at least one processor; receiving a device descriptor in the at least one processor, the device descriptor for a corresponding USB or Firewire device that is connected to the port security device; and determining in the at least one processor whether the device descriptor is on a blacklist of excluded device descriptors. If the device descriptor is on the blacklist, the USB or Firewire device is rejected from interconnection with the protected host computer or device. If the device descriptor is not on the blacklist, the USB or Firewire device is accepted for interconnection with the protected host computer or device. The device descriptor is then sent from the at least one processor to the protected host computer or device, and an enable device command is initiated in the at least one processor to permit data on the USB or Firewire device to be transmitted to the protected host computer or device.

Example 9 includes the method of Example 8, wherein if a request to change state is received by the at least one processor from the USB or Firewire device, the method further comprises rejecting the USB or Firewire device from continued data transmission to the protected host computer or device.

Example 10 includes the method of any of Examples 8-9, wherein the protected host computer or device includes a graphical user interface.

Example 11 includes the method of any of Examples 8-10, wherein the port security device further includes a wireless transceiver in operative communication with a portable device.

Example 12 includes the method of Example 11, wherein the portable device comprises a tablet or a smart phone.

Example 13 includes the method of any of Examples 11-12, wherein the portable device includes an electronic flight bag application.

Example 14 includes a method for securing USB or Firewire port interconnections, the method comprising providing a port security device that is operatively coupled to a protected host computer or device, the port security device including at least one processor and associated with a user interface; receiving a device descriptor in the at least one processor, the device descriptor for a corresponding USB or Firewire device that is connected to the port security device; and determining in the at least one processor whether a user authentication entered on the user interface is valid. If the user authentication is not valid, USB or Firewire device is rejected from interconnection with the protected host computer or device. If the user authentication is valid, the USB or Firewire device is accepted for interconnection with the protected host computer or device. The device descriptor is then sent from the at least one processor to the protected host computer or device, and an enable device command is initiated in the at least one processor to permit data transmission from the USB or Firewire device to the protected host computer or device.

Example 15 includes the method of Example 14, wherein if a request to change state is received by the at least one processor from the USB or Firewire device, the method further comprises determining in the at least one processor whether another user authentication entered on the user interface is valid. If the another user authentication is not valid, the USB or Firewire device is rejected from continued data transmission to the protected host computer or device. If the another user authentication is valid, the enable device command continues to permit data transmission from the USB or Firewire device to the protected host computer or device.

Example 16 includes the method of any of Examples 14-15, wherein the user interface includes a series of input buttons associated with a display screen.

Example 17 includes the method of any of Examples 14-16, wherein the user interface is implemented by a graphical user interface on the protected host computer or device Example 18 includes the method of any of Examples 14-17, wherein the port security device further includes a wireless transceiver in operative communication with a portable device.

Example 19 includes the method of Example 18, wherein the portable device comprises a tablet or a smart phone.

Example 20 includes the method of any of Examples 18-19, wherein the portable device includes an electronic flight bag application.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A device for securing universal serial bus (USB) or Firewire port interconnections, the device comprising:
 a microcontroller comprising at least one processor;
 a first connector or lead in operative communication with the microcontroller, the first connector or lead configured to be coupled with a USB or Firewire external device;
 a second connector or lead in operative communication with the microcontroller, the second connector or lead configured to be coupled with a protected host; and
 a display screen on the device in operative communication with the microcontroller and configured to receive one or more user inputs;
 wherein, when the microcontroller detects that the second connector or lead is coupled to the protected host and that the USB or Firewire external device is coupled to the first connector or lead, the at least one processor is configured to display a first prompt on the display screen for a user to initiate one or more inputs of a user authentication prior to the USB or Firewire external device being allowed to connect with the protected host;
 wherein if a request to change state is received by the at least one processor from the USB or Firewire device, the at least one processor is further configured to display a second prompt on the display screen for the user to initiate one or more inputs of a user authentication; and
 wherein the at least one processor is configured to either (1) reject the USB or Firewire device from continued data transmission to the protected host if a user authentication input responding to the second prompt is determined to be not valid, or (2) continue to connect with the protected host if a user authentication input responding to the second prompt is determined to be valid.

2. The device of claim 1, further comprising a logging function in operative communication with the microcontroller.

3. The device of claim 1, wherein the display screen is implemented with a series of input buttons associated with the display screen.

4. The device of claim 1, wherein the display screen is implemented by a graphical user interface.

5. The device of claim 1, further comprising a wireless transceiver in operative communication with the microcontroller and configured for wireless connection with a portable device.

6. The device of claim 5, wherein the portable device comprises a tablet or a smart phone.

7. The device of claim 5, wherein the portable device includes an electronic flight bag application.

8. A method for securing universal serial bus (USB) or Firewire port interconnections, the method comprising:
 receiving, by at least one processor in a port security device having a first connector or lead and a second connector or lead that is operatively coupled by the second connector or lead to a protected host computer or device, a device descriptor for a corresponding USB or Firewire device that is connected to the port security device by the first connector or lead; and
 determining, by the at least one processor, whether a user authentication entered on a display screen of the port security device is valid;
 wherein if the user authentication is not valid:
  rejecting, by the at least one processor, the USB or Firewire device from interconnection with the protected host computer or device;
 wherein if the user authentication is valid:
  accepting, by the at least one processor, the USB or Firewire device for interconnection with the protected host computer or device;
  sending, by the at least one processor, the device descriptor from the at least one processor to the protected host computer or device; and
  initiating, by the at least one processor, an enable device command to permit data transmission from the USB or Firewire device to the protected host computer or device;
 wherein if a request to change state is received by the at least one processor from the USB or Firewire device, the method further includes determining, by the at least one processor, whether another user authentication entered on the display screen of the port security device is valid; and
 either (1) rejecting, by the at least one processor, the USB or Firewire device from continued data transmission to the protected host if the another user authentication is determined to be not valid, or (2) continue to connect with the protected host if the another user authentication is determined to be valid.

9. The method of claim 8, wherein the display screen of the port security device includes a series of input buttons associated with the display screen.

10. The method of claim 8, wherein the display screen of the port security device is implemented by a graphical user interface.

11. The method of claim 8, wherein the port security device further includes a wireless transceiver in operative communication with a portable device.

12. The method of claim 11, wherein the portable device comprises a tablet or a smart phone.

13. The method of claim 11, wherein the portable device includes an electronic flight bag application.

14. The device of claim 1, wherein when the microcontroller detects that the USB or Firewire external device is coupled to the first connector or lead, the at least one processor is further configured to:
 automatically prevent the USB or Firewire external device from being connected with the protected host if the USB or Firewire external device is on a blacklist of devices known to have device handlers in the protected host at a basic input output system (BIOS) level, without modifying the protected host.

15. The method of claim 8, further comprising:
 determining, by the at least one processor, whether the device descriptor is on a blacklist of excluded device descriptors;
 wherein if the device descriptor is on the blacklist:
  rejecting, by the at least one processor, the USB or Firewire device from interconnection with the protected host computer or device;
 wherein if the device descriptor is not on the blacklist:
  accepting, by the at least one processor, the USB or Firewire device for interconnection with the protected host computer or device;
  sending, by the at least one processor, the device descriptor from the at least one processor to the protected host computer or device; and
  initiating, by the at least one processor, an enable device command in the at least one processor to permit data on the USB or Firewire device to be transmitted to the protected host computer or device.

16. The device of claim 1, where the request to change state includes a request to change from a first type of USB or Firewire device to a second type of USB or Firewire device.

17. The method of claim 8, where the request to change state includes a request to change from a first type of USB or Firewire device to a second type of USB or Firewire device.

* * * * *